July 4, 1967  E. J. ROGERS  3,329,822
MEANS FOR EQUALIZING TWO OUTPUT SIGNALS
Filed June 22, 1964  3 Sheets-Sheet 2

2a. WAVEFORM AT 15 OUTPUT
2b. WAVEFORM AT 17 OUTPUT
2c. WAVEFORM AT 23 OUTPUT

DOTTED LINES SHOW WAVEFORMS FOR SMALL
UNBALANCE OF dc LEVELS AT PT OUTPUTS.

*INVENTOR.*
EDWIN J. ROGERS
*BY*

United States Patent Office 3,329,822
Patented July 4, 1967

3,329,822
MEANS FOR EQUALIZING TWO OUTPUT SIGNALS
Edwin J. Rogers, Shoreham, N.Y., assignor to the United States of America as represented by the United States Atomic Energy Commission
Filed June 22, 1964, Ser. No. 377,143
4 Claims. (Cl. 250—209)

ABSTRACT OF THE DISCLOSURE

An equalizer for flying spot machines for scanning and analyzing pictures by transmitting light through the film having an interferometer for determining the position of the film by projecting light through gratings on to phototransistors whose outputs are equivalent to provide the desired information. These outputs are equalized by converting them into square wave error signals that indicate the direction of their unbalance and actuate an electronic digital-to-analog converter responsive to the error to adjust the bias of one of the phototransistors to balance the phototransistor outputs.

---

Figure 1:
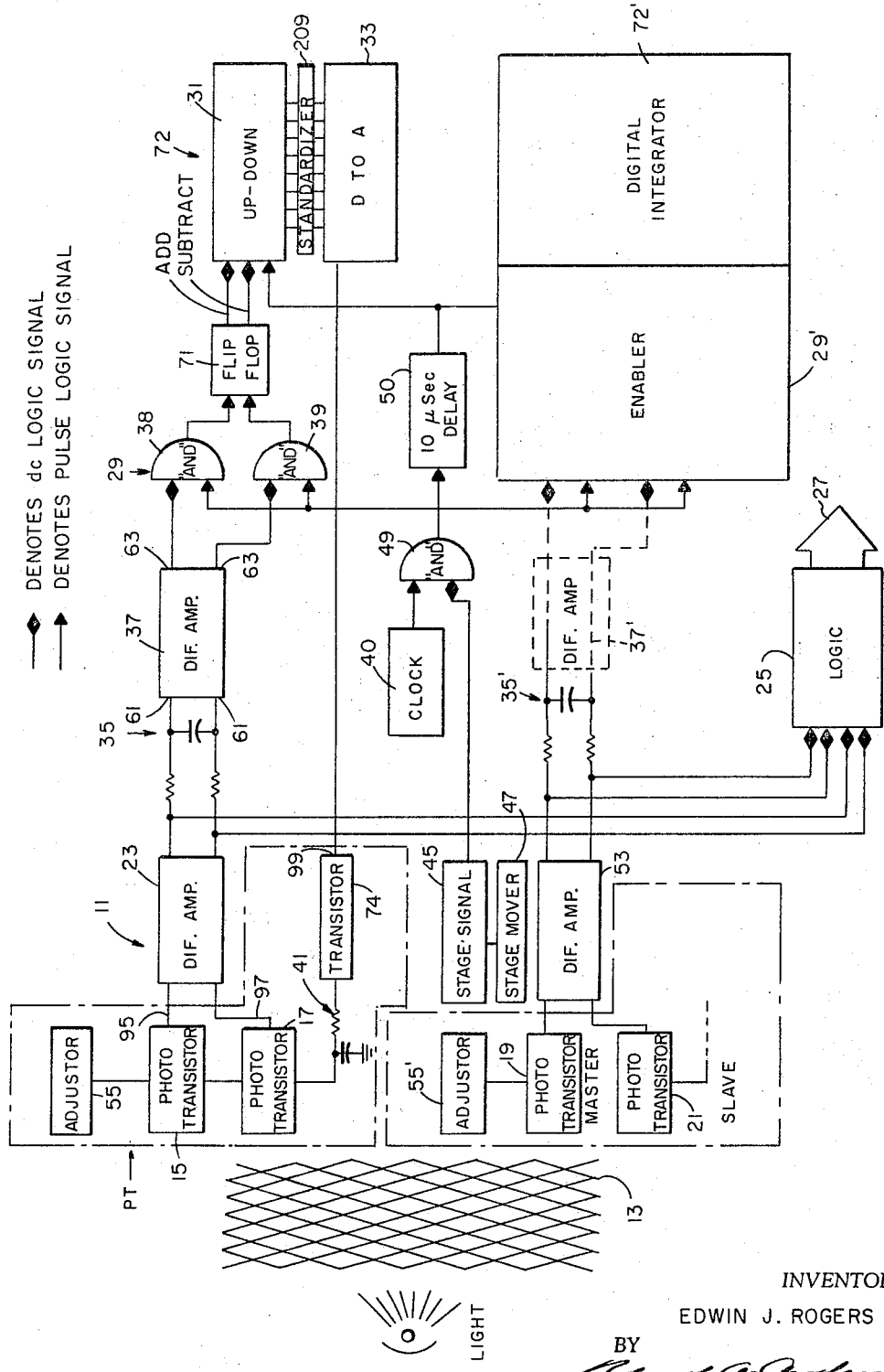

This invention relates generally to flying spot machines and more particularly to a novel servo-feedback method and apparatus therefor. The invention described herein was made in the course of, or under a contract with the United States Atomic Energy Commission.

It is known that bubble chamber pictures can be analyzed by using flying spot systems. One such system is described in U.S. Patent 3,069,654 and Brookhaven National Laboratory Reports BNL 725 (T–259) Feb. 14, 1962, BNL 6620 (G29, BCHP–03–O–B) Aug. 20, 1962, and BNL 6878 (C–37) Mar. 30, 1963. In this system the spot of light scans the entire bubble chamber picture frame film areas as the film slowly moves at right angles to the light beam sweep so as to generate a raster. Behind the film a photomultiplier detects whenever the spot passes over a bubble image, and the coordinates of each bubble are logically digitized electronically and sent into a large electronic computer for selection and storage. The position of the moving film stage is determined by an interferometer comprised of a pair of slightly inclined ruled gratings of which one is fixed and the other attached to the moving stage. Light from a fixed lamp is projected through the gratings onto four phototransistors whose resulting output voltages contain the desired position information. When the stage is moving these voltages are small AC signals in phase quadrature whose DC levels must be accurately controlled and balanced. The phototransistors are arranged in pairs producing substantially sine wave outputs 180° out of phase.

In balancing the DC levels of these two AC electrical output signals manual balancing of the transistor base bias voltage is conventionally employed but this is slow acting and frequent rechecking and adjusting is required. Moreover, systems utilizing electronic integrators have not been used since the integrators are subject to temperature and power supply variations and they have leakages causing them to accumulate substantial errors during long "off" periods. It is also advantageous to avoid the use of electro-mechanical components since the movable components have been subject to wear and have produced inaccuracies or frequent or expensive maintenance.

In accordance with this invention, these problems and deficiencies are overcome by providing a continuous, fast acting, automatic, all electronic servo-feedback system having an instantaneously acting long lasting memory. More particularly, this invention involves feeding the photomultiplier outputs into an output clamped difference amplifier to produce square wave voltages which are asymmetric when the DC levels of the outputs are out of balance, extracting the DC component which results from the asymmetry in these square-waves with an R-C filter, and using a digital integrator for providing the necessary control voltage and memory from this sensed unbalance. With the conversion of this control voltage to a current, the proper phototransistor base bias is provided to produce the desired phototransistor output levels.

It is an object of this invention, therefore, to provide an accurate, fast acting and durable servo-feedback apparatus and method;

It is another object of this invention to provide an improved feedback system for balancing the DC level of phototransistors having an AC output;

It is another object of this invention to provide continuous, fast, accurate phototransistor voltage output balancing to within ±0.1 volt;

It is another object of this invention to match direct current output levels in a pair of sensing devices in which alternating current components are small compared to direct current levels;

It is another object of this invention to utilize asymmetry in the square-wave output voltage of an output clamped difference amplifier to provide a comparison and control signal;

It is another object of this invention to utilize this comparison and control signal in adding or subtracting from the content of a register from which a digital-to-analog converter extracts information to provide a base bias current for phototransistor output matching;

Still another object of this invention is provision for handling phototransistor outputs for providing precise means for measuring stage position of a moving stage in a flying spot digitizer.

The above and further novel features of the invention will appear more fully from the following detailed description when the same is read in connection with the accompanying drawings. It is to be expressly understood, however, that the drawings are not intended as a definition of the invention but are for the purpose of illustration only.

Figure 2A:
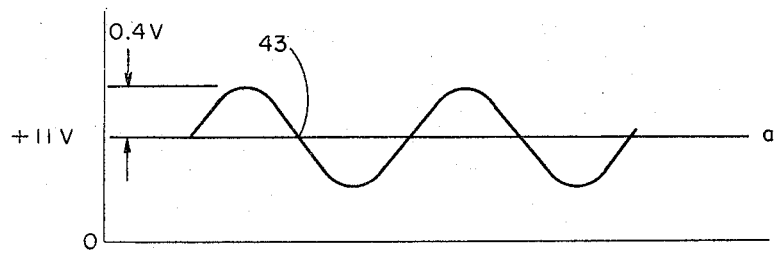
Figure 2B:
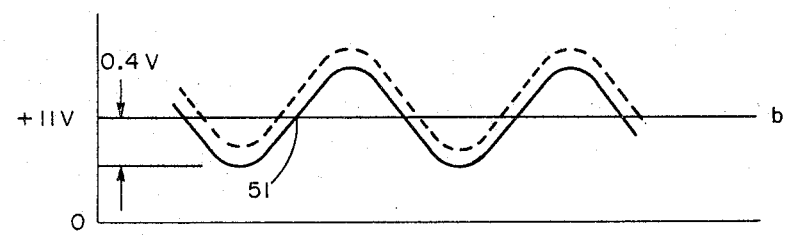
Figure 2C:
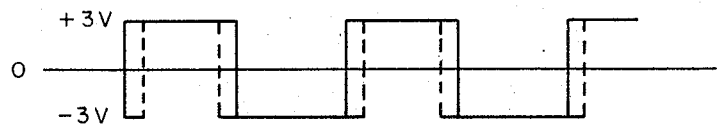
Figure 3:
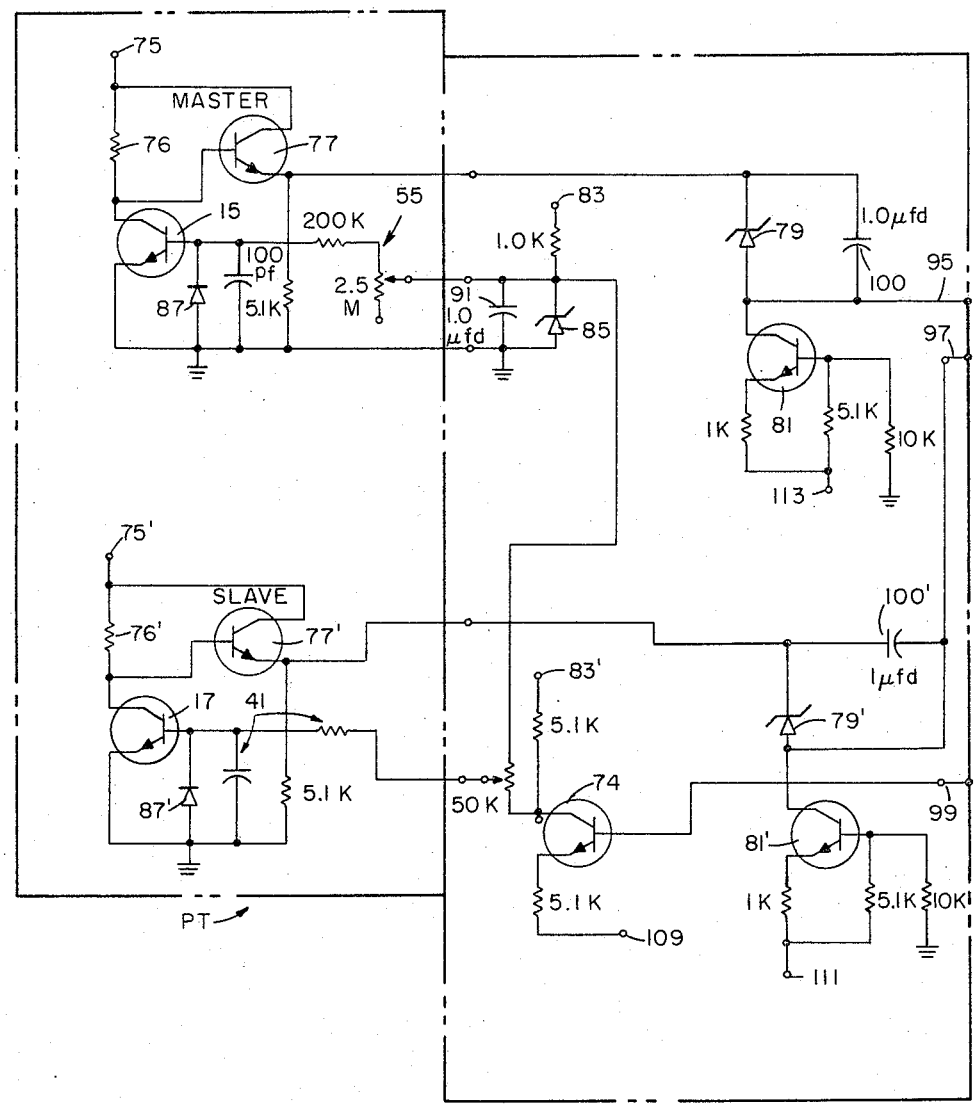

In the drawings where like parts are marked alike:
FIG. 1 is a partial schematic drawing of the system of this invention;
FIG. 2a is a graphic illustration of the wave form produced by one phototransistor of FIG. 1;
FIG. 2b is a graphic illustration of the wave form produced by another phototransistor of FIG. 1;
FIG. 2c is a graphic illustration of the wave form at the output of one difference amplifier of FIG. 1.
FIG. 3 is a diagrammatic drawing of a phototransistor circuit for a flying spot machine.

Referring now to FIG. 1, interferometer 11 for digitizing the film stage position utilizes the moire fringes which result when the above-mentioned light is transmitted through a pair of inclined ruled gratings 13. The light output is sensed by phototransistors, hereinafter referred to as PT's 15, 17, 19, and 21, arranged to yield signals in phase quadrature as the film stage is moved. The output voltage of each PT is compared with that of its antiphase mate and to this end the outputs are fed to a difference amplifier, such as difference amplifier 23, which transmits DC logic signals to the stage position logic 25, comprising standard electronic logic components, to produce a stage position output 27.

Difference amplifier 23 is a conventional high-gain, output-clamped difference amplifier. It detects the crossover points of the output voltages of PT's 15 and 17 and delivers a square wave output voltage which is used together with one similarly derived from PT's 19 and 21 to drive the logic circuitry which yields the stage position information.

The modulation percentage of the light transmitted through the gratings 13 is low. The roughly sinusoidal PT output signal voltage has peak to peak value of only 0.8 v. with DC component of approximately 11 volts, as illustrated by the solid lines in FIGS. 2a and 2b. If there is a small inequality between the DC levels of the compared outputs the voltages will go through equal values at points unequally spaced in time, producing an asymmetry in the output waveform of difference amplifier 23 and a corresponding displacement in the points at which the stage position is digitized. The waveforms resulting from a small unbalance are shown by dotted lines in FIGS. 2b and 2c. A maximum permissible position error of 0.75 $\mu$ imposes a matching tolerance of ±0.1 volt on the DC levels.

The servo-feedback system of this invention accurately senses, adjusts and continuously maintains the DC level of PT 17 at a value equal to that of PT 15. To this end if the DC output level of PT 17 differs from that of PT 15 the resulting asymmetric square wave output of amplifier 23 will contain a DC component whose sign indicates the direction of unbalance as shown in FIG. 2c. When the base lines $a$ and $b$ (FIGS. 2a and 2b) of the two phototransistors 15 and 17 are equal, on the other hand, there is a zero DC output from filter 35.

The positive or negative DC component extracted by R-C filter 35 is applied to the input of difference amplifier 37, which is similar to difference amplifier 23. This second difference amplifier 37 converts the small extracted DC unbalance signal to a DC logic level, i.e., converts a low voltage positive or negative to a large voltage positive or negative for enabling system 29, comprising appropriate "and" gates and a flip-flop for adding or subtracting respectively. Thus, depending on the sign of the unbalance the appropriate "and" gate 38 or 39 at the output of this second difference amplifier 37 will be enabled and the counter 31 will add or subtract the clock pulses coming from 100 p.p.s. clock 40 from the counter content.

The output voltage of the digital-to-analog converter 33 is proportional to the content of the 8-bit up-down counter 31 or register for storing the digital pulse information. This changes the voltage from digital-to-analog converter 33, and consequently the bias on PT 17, to restore the balance of the outputs from PT 15 and 17. Advantageously, circuit values are chosen for a PT DC output level (e.g., of +11 volts) to require the counter 31 to contain about half of its 255 count capacity.

The R-C filter 41 has a time constant of 100 $\mu$sec. This value was made large enough to insure that the contribution to the time derivative of the output voltage of PT 17 due to a bias correction will be substantially smaller than the slope of the signal voltage at the crossover points 43 and 51 (FIGS. 2a and 2b) when the stage moving signal means 45 actuates the stage moving means 47 at its lowest velocity thus preventing the servo from introducing false crossover information into the first difference amplifier 23.

The time constant of the R-C filter 35 is 20 $\mu$sec. This value is adequate to reduce the ripple in the input voltage of the second difference amplifier 37 at the lowest stage velocity, to a peak value substantially smaller than the DC level correction corresponding to a change of one count. A fortuitous phase relation between the ripple and the clock pulses cannot, therefore, cause a correction to occur in the wrong direction. Dynamic stability of the loop is assured by the fact that the cut-off frequency of R-C filter 35 is hundreds of times lower than that of the rest of the loop.

When the stage driving means 47, advantageously a motor, is stopped to stop the stage (not shown) the PT output voltage will stand at some arbitrary point in the cycle which, in general, does not represent the correct DC level. When the stage driving means 47 and stage is not in motion "and" gate 49 turns off the clock pulses from clock 40 to prevent the servo feed-back system of this invention from operating.

In operation, the position of the moving film stage is measured by interferometer 11 by means of PT's 15, 17, 19, and 21 arranged to yield signals in phase quadrature with balanced outputs in each pair of PT's. To obtain this matching the cross-over points 43 and 51 of the output voltages of each pair of PT's (i.e., 15–17 and 19–21) are detected by high gain output-clamped difference amplifiers 23 and 53, respectively, delivering a square-wave voltage signal which drives logic circuitry to yield the desired film-stage position information. For ease of explanation, the operation of the DC level servo balancing circuitry is described with reference to only one PT pair since the operation of each pair of PT's corresponds to the other.

Manually adjustable means 55 supplies a direct current base bias to the first phototransistor 15. If the output level of PT 17 differs from that of PT 15 amplifier 23 produces an asymmetric square wave output containing a DC component whose sign indicates the direction of unbalance. This DC component is extracted by R-C filter 35 and applied to the input terminals 61 of difference amplifier 37. Depending on the sign of the unbalance the appropriate "and" gate 38 or 39 connected to the output terminals 63 and flip-flop switch 71 are actuated to cause up-down counter 31 to add or subtract the clock pulses from the counter content. Advantageously, these clock pulses are delayed by delay means 50 to permit a settling time for flip-flop 71 so that the enabling system 29 (or its corresponding system 29') suitably enables the digital integrator 72 (and its corresponding digital integrator 72') to receive the initial clock pulses. In this integrator 72, digital counter-register 31 stores the digital pulse information from the clock 40 in response to the direct current component extracted from the asymmetry in the square wave voltage output from difference amplifier 23. Thereupon, the digital-to-analog converter 33 supplies a direct current voltage which is converted to a corresponding bias current for PT 17 in transistor 74 and this current is proportional to the level of the digital pulse information in the digital register 31. This produces a matching in the outputs of PT's 15 and 17. The "and" gate 49 merely prevents the further addition or subtraction of the digital pulse information when the film stage is not moving. It is noted, however, that the register 31 at all times comprises a memory of the necessary level of the bias on phototransistor 17.

Referring now to FIG. 3, in actual practice the elements of this invention are standard items. For example, phototransistors 15 and 17 are FSP5 phototransistors made by Fairchild Semiconductor, Mountain View, Calif. The +20-volt sources 75 and 75' are connected to the collectors through 56K resistors 76 and 76'. Emitter followers 77 and 77' are standard 2N1308 transistors to provide suitable current gain from the phototransistor outputs for zener diodes 79 and 79' (e.g., from Texas Instruments, model IN759A), which provide constant voltage drops. The latter are provided for one suitable difference amplifier 23, which is a model 1547 from Digital Equipment Corp., Maynard, Mass., hereafter referred to as DEC. Transistors 81 and 81', which are type 2N1308 transistors, provide a constant current drain to maintain proper current through the zener diodes 79 and 79'. Voltage-to-bias-current transistor converter 74 is a type 2N1308 transistor. The manual control 55, positive 10-volt sources 83 and 83', (model 1N751) zener diode 85 and 85', (model 1N100) diodes 87 and 87' and other elements are conventional circuit elements for those described. The 1.0 $\mu$fd. capacitors 91, 100 and 100' reduce noise from zener diodes 85, 79 and 79', respectively, sources 109, 111, 113 are standard −15-volt DC sources. As will be understood from the above outputs 95 and 97 correspond to the PT outputs 95 and 97 in FIG. 1 and input 99 corresponds to bias control input 99 of FIG. 1.

The following is a table of suitable standard components shown in FIG. 1:

| Element | Description | DEC Model # |
|---|---|---|
| R-C filter 35 | 1 µfd. cap.—20,000 res | |
| Amplifier 37 | Difference amplifier | 1547 |
| Gate 38 | "And" gate | 4106 |
| Gate 39 | do | 4106 |
| Gate 49 | do | 4106 |
| Flip-Flop | | 4214 |
| Counter 31 | Up-down | 4125 |
| Converter | D to A | 1563 |
| R-C filter 41 | 1 meg resister and 100 pt. capacitor | |
| Clock | 100 p.p.s. | 4410 |

A set of standard level standardizers is provided between counter 31 and converter 33. One suitable standardizer 209 is a DEC model 4667 and one standardizer is provided for each bit to more clearly define the counter output voltages to improve the accuracy of the converter 33.

This invention has the advantage of providing a precise, continuous, fast acting system and means for matching the output voltage of a pair of photo-transistors. Actual matching to ±.01 volt, for example, has been achieved. Moreover this system provides a digital integrator, comprising a counter-register and a digital-to-analog converter in a servo feedback system which utilizes the asymmetry of a square wave output, which is used in providing precise means for measuring the stage position of a moving stage in a flying-spot digitizer. Additionally, the system of this invention provides a feedback technique for equalizing the DC levels of the described two PT outputs so that AC signal components, which are much smaller than the DC levels, can be compared accurately without requiring the introduction of a low frequency cut-off and consequent rate dependency into the system.

What is claimed is:

1. Apparatus for matching two direct current output levels, comprising means for producing square waves in response to said outputs, means for extracting from said square waves a signal whose sign indicates the direction of unbalance in said outputs, and electronic digital integration means continuously responsive to said signal for providing a control signal corresponding to the unbalance in said outputs for quickly and continuously balancing said outputs.

2. The invention of claim 1 in which said extracting means is an R-C filter network which extracts a DC voltage component which results from an asymmetry in said square wave outputs.

3. In apparatus of the type employing a pair of phototransistors arranged to yield signals whose crossover points are detected by a high-gain output-clamped difference amplifier delivering a square-wave voltage signal which drives logic circuitry, means for adjusting the direct current base bias of said pair of said phototransistors to match the DC levels of their output voltages, comprising: manually adjustable means for supplying a direct current base bias to a first phototransistor of said pair; means for extracting a direct current component from asymmetry in the said square wave voltage signal, said asymmetry resulting from a difference in the output level of said first phototransistor and a second phototransistor of said pair when their direct current output voltages are not matched; digital counter-register means for storing digital pulse information; means for adding or subtracting said digital pulse information in said digital counter-register means in response to said direct current component extracted by said means for extracting a direct current component; and, means comprising a digital-to-analog converter for supplying to said second phototransistor a direct current base bias which is proportional to the level of said digital pulse information in said digital counter register means.

4. The invention of claim 3 for determining the location of a film stage having means for preventing further addition and subtraction of said digital pulse information when said film stage is motionless.

References Cited

UNITED STATES PATENTS

| | | | |
|---|---|---|---|
| 2,565,265 | 8/1951 | Peterson | 250—207 |
| 3,056,029 | 9/1962 | Budnick | 250—208 |
| 3,114,046 | 12/1963 | Cabaniss et al. | 250—237 |
| 3,171,032 | 2/1965 | Holt | 250—207 |
| 3,214,593 | 10/1965 | Killpatrick | 250—209 X |
| 3,277,888 | 1/1966 | Shepherd et al. | 250—237 |

RALPH G. NILSON, *Primary Examiner.*

M. A. LEAVITT, *Assistant Examiner.*